US008451492B2

(12) United States Patent
Hoshino

(10) Patent No.: US 8,451,492 B2
(45) Date of Patent: May 28, 2013

(54) PRINTING APPARATUS AND DRIVING FORCE TRANSFER CONTROL METHOD

(75) Inventor: Ken Hoshino, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 945 days.

(21) Appl. No.: 12/537,667

(22) Filed: Aug. 7, 2009

(65) Prior Publication Data

US 2010/0157328 A1 Jun. 24, 2010

(30) Foreign Application Priority Data

Aug. 22, 2008 (JP) ................................. 2008-214639

(51) Int. Cl.

| | |
|---|---|
| ***G06K 1/00*** | (2006.01) |
| ***H04N 1/46*** | (2006.01) |
| ***B41J 2/165*** | (2006.01) |
| ***B41J 2/05*** | (2006.01) |

(52) U.S. Cl.

USPC ................ 358/1.8; 358/502; 347/30; 347/33; 347/57

(58) Field of Classification Search

None

See application file for complete search history.

(56) References Cited

U.S. PATENT DOCUMENTS

2002/0071003 A1 * 6/2002 Kimura ........................... 347/54
2009/0214228 A1 * 8/2009 Ito .................................. 399/21

* cited by examiner

*Primary Examiner* — Thomas Lett

(74) *Attorney, Agent, or Firm* — Fitzpatrick, Cella, Harper & Scinto

(57) ABSTRACT

This invention is directed to a printing apparatus capable of reliably performing a driving switching operation using movement of a carriage. In the printing apparatus, it sometimes cannot be determined to which of a clutch lever or the cap of a printhead the carriage abuts against. In this case, even if the carriage abuts against the cap, a position where the abutment was detected is regarded as the temporary home position of the carriage. When a conveyance motor is driven to transfer its driving force to a desired engaging destination, the cap is retracted from the moving path of the carriage. The driving force of the conveyance motor can thereby be transferred to the desired engaging destination.

9 Claims, 8 Drawing Sheets

PRINTING APPARATUS AND DRIVING FORCE TRANSFER CONTROL METHOD

BACKGROUND OF THE INVENTION

1. Field of the Invention

The present invention relates to a printing apparatus and driving force transfer control method. Particularly, the present invention relates to a printing apparatus having a switching mechanism which, if necessary, utilizes movement of a carriage to switch the transfer destination of the driving force of a driving source for conveying a printing medium, in order to drive another mechanism, and a driving force transfer control method for the apparatus.

2. Description of the Related Art

An inkjet printing apparatus prints by discharging ink from a printhead onto a printing medium. The inkjet printing apparatus has the following advantages. For example, the printhead can be easily downsized and can print a high-resolution image quickly. The printing apparatus can print on plain paper without any special processing. The apparatus requires low running cost, and hardly generates noise because of non-impact printing. The apparatus can easily print a color image with inks of multiple colors.

The printhead of the printing apparatus is generally formed by arraying small orifices. In some cases, ink becomes non-dischargeable or unprintable due to bubbles or dust entering the orifices, or high ink viscosity upon evaporation of ink solvent. In this case, the ink is refreshed to eliminate the cause of the discharge failure.

Most general-purpose serial printing apparatuses employ a DC motor as a driving source for scanning a carriage supporting a printhead. Such a printing apparatus often uses a DC motor even as a driving source for conveying a printing medium in a direction perpendicular to the moving direction of the carriage.

Printing apparatuses capable of driving a plurality of mechanisms using a single driving source have been developed to decrease the number of motors serving as driving sources for the sake of cost reduction of the apparatuses, space-saving, and the like.

A printing apparatus of this type includes a switching mechanism for switching a mechanism to be driven, as needed.

An example of conventional driving switching mechanisms proposed for a serial printing apparatus utilizes driving of a carriage.

The driving switching mechanism can convey a printing medium and drive a recovery mechanism using a single conveyance motor. A clutch gear is arranged as a mechanism for switching the driving. When the carriage moves to a switching position, the clutch gear is pushed by the carriage to engage with an LF gear. At the switching position, a home position sensor cannot detect the light shielding plate of the carriage and thus determines that the carriage has reached the switching position. The driving switching operation can be reliably executed using movement of the carriage. Conventional techniques pertaining to this mechanism include one disclosed in Japanese Patent Laid-Open No. 9-141966.

In this prior art, the cap of a printhead is interposed between a clutch gear and a switching position (home position).

This arrangement suffers the following problem when the switching position is set between the clutch gear and the cap or at the same position as the clutch gear and the home position sensor has not correctly detected the carriage position. That is, it cannot be determined whether the carriage is appropriately pushing the clutch gear or the printhead is capped. This problem prevents reliable execution of the driving switching operation using movement of the carriage.

SUMMARY OF THE INVENTION

Accordingly, the present invention is conceived as a response to the above-described disadvantages of the conventional art.

For example, a printing apparatus and driving force transfer control method according to this invention are capable of reliably performing a driving switching operation using movement of a carriage.

According to one aspect of the present invention, preferably, there is provided a printing apparatus which reciprocates a carriage supporting a printhead by a driving force of a carriage motor and prints on a printing medium using the printhead, the apparatus comprising: conveyance means for conveying the printing medium using a driving force of a conveyance motor; recovery means for recovering the printhead using the driving force of the conveyance motor; transfer means for transferring the driving force of the conveyance motor to either of the conveyance means and the recovery means; switching means for switching a transfer destination of the driving force of the conveyance motor by the transfer means; detection means for detecting a home position of reciprocation of the carriage; and control means for performing control to operate the switching means based on the home position detected by the detection means to transfer the driving force of the conveyance motor to either of the conveyance means and the recovery means.

According to another aspect of the present invention, preferably, there is provided a driving force transfer control method applied to a printing apparatus comprising conveyance means for conveying a printing medium using a driving force of a conveyance motor, recovery means for recovering a printhead using the driving force of the conveyance motor, and transfer means for transferring the driving force of the conveyance motor to either of the conveyance means and the recovery means, the printing apparatus reciprocating a carriage supporting the printhead by a driving force of a carriage motor and printing on the printing medium using the printhead, the method comprising: a detection step of detecting a home position of reciprocation of the carriage; and a control step of performing control to operate, based on the home position detected in the detection step, switching means for switching a transfer destination of the driving force of the conveyance motor by the transfer means, thereby transferring the driving force of the conveyance motor to either of the conveyance means and the recovery means.

The invention is particularly advantageous since driving of a conveyance motor to drive another mechanism is prevented while the conveyance motor is not ready to transfer its driving force to the other mechanism.

Further features of the present invention will become apparent from the following description of exemplary embodiments with reference to the attached drawings.

DESCRIPTION OF THE EMBODIMENTS

Figure 1:
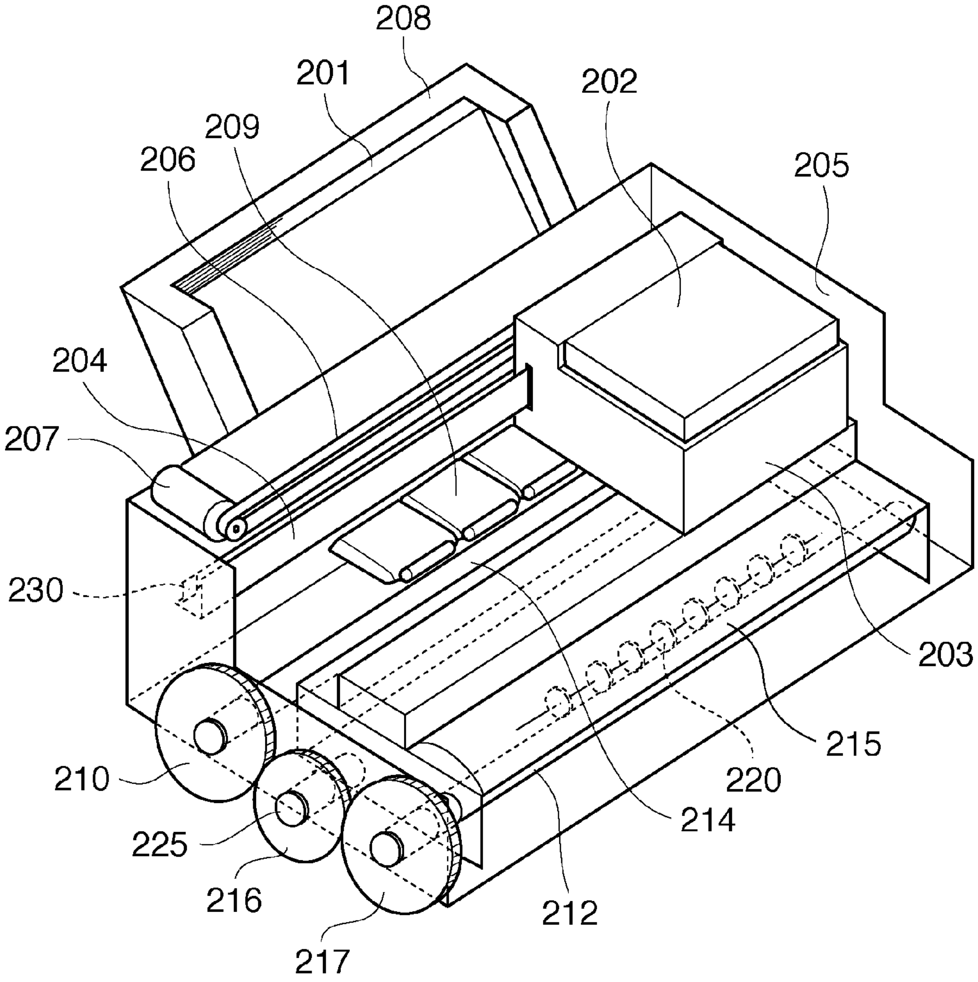
FIG. 1 is a perspective view showing the outer appearance of an inkjet printing apparatus as a typical embodiment of the present invention.

An Exemplary embodiment of the present invention will now be described in detail in accordance with the accompanying drawings. Note that the same reference numerals denote the same parts, and a repetitive description thereof will be omitted.

In this specification, the terms “print” and “printing” not only include the formation of significant information such as characters and graphics, but also broadly include the formation of images, figures, patterns, and the like on a print medium, or the processing of the medium, regardless of whether they are significant or insignificant and whether they are so visualized as to be visually perceivable by humans.

Also, the term “print medium” not only includes a paper sheet used in common printing apparatuses, but also broadly includes materials such as cloth, a plastic film, a metal plate, glass, ceramics, wood, and leather, capable of accepting ink.

Furthermore, the term “ink” (to be also referred to as a “liquid” hereinafter) should be extensively interpreted similar to the definition of “print” described above. That is, “ink” includes a liquid which, when applied onto a print medium, can form images, figures, patterns, and the like, can process the print medium, and can process ink. The process of ink includes, for example, solidifying or insolubilizing a coloring agent contained in ink applied to the print medium.

FIG. 1 is a perspective view showing the outer appearance of an inkjet printing apparatus (to be referred to as a printing apparatus) as a typical embodiment of the present invention.

The printing apparatus shown in FIG. 1 includes a paper feed base 208, a pressure plate (not shown), a pickup roller (not shown), a conveyance roller 214, and pinch rollers 209 to feed and convey a printing medium 201. The printing apparatus also includes a carriage 203 which detachably supports an inkjet printhead (to be referred to as a printhead) 202 for printing on the printing medium 201. The printing apparatus further includes a guide rail 204 fixed to a frame 205 at two ends. The guide rail 204 supports the carriage 203 so that the carriage 203 can slide in a direction perpendicular to the conveyance direction of the printing medium 201 and in a direction parallel to the surface of the printing medium 201.

The printing apparatus includes a carriage belt 206, carriage motor 207, and carriage driving pulley (not shown) to reciprocally scan the carriage 203. The printing apparatus includes an incremental linear encoder in a direction parallel to the guide rail 204 to detect position information of the carriage 203. The incremental linear encoder is formed from a carriage encoder sensor (not shown) and a carriage cord strip 230.

In this arrangement, the pickup roller and conveyance roller 214 rotate to feed the printing medium 201 into the apparatus and convey it to a position where it faces the ink discharge surface of the printhead 202. Then, the carriage motor 207 is driven to rotate the carriage belt 206, and the carriage 203 is reciprocally scanned straight along the guide rail 204. At the same time, the printhead 202 mounted in the carriage 203 discharges ink in accordance with a print signal, printing an image on the printing medium 201.

Clogging may occur in orifices due to a foreign substance such as paper dust or dirt adhering to the ink discharge surface or orifices of the printhead 202, or to high viscosity or fixation of ink near the orifices after remaining ink has dried. The clogging leads to a discharge failure (including no discharge).

To prevent clogging, the printing apparatus adopts a cleaning mechanism. The cleaning mechanism hermetically covers the orifice surface of the printhead 202 with a cap (not shown) when no printing is performed. Also, the cleaning mechanism removes any foreign substance adhering to the orifice surface of the printhead 202. A specific example of the cleaning mechanism is a mechanism which wipes and cleans the orifice surface of the printhead 202 with a flexible wiper (not shown). The wiper and cap are arranged outside the printing region of the printhead 202. The tight closing operation (capping operation) with the cap is performed after the printhead moves to a capping position set outside the printing region.

In addition, a recovery mechanism is arranged to recover the orifices by sucking ink from them via the cap by a suction means (not shown) such as a pump.

One end of the conveyance roller 214 is connected to an LF gear (conveyance gear) 210 which transfers the rotation of the conveyance roller 214 to a delivery roller 212 via an LF intermediate gear 216 and delivery roller gear 217. An incremental rotary encoder is arranged on the axis of a supporting point 225 of the LF intermediate gear 216 to detect position information of the conveyance roller 214. Note that the incremental rotary encoder may be formed from an LF encoder sensor (not shown) and an LF cord wheel (not shown).

Referring to FIG. 1, reference numeral 215 denotes a platen; and 220, spur gears.

In a normal printing operation, a printing medium conveyance operation need not be executed at the same time as a printhead suction recovery operation and cleaning operation. Neither the printhead suction recovery operation nor cleaning operation needs be performed when feeding a printing medium from the outside of the printing apparatus, intermittently conveying it, or discharging it outside the apparatus.

Hence, the printing apparatus uses the conveyance motor as a single driving source to perform conveyance of a printing medium, and suction recovery and cleaning of the printhead. For this purpose, the printing apparatus includes a driving switching mechanism for switching the transfer destination of the driving force of the conveyance motor between the suction recovery mechanism and cleaning mechanism, and the printing medium conveyance mechanism.

Figure 2:
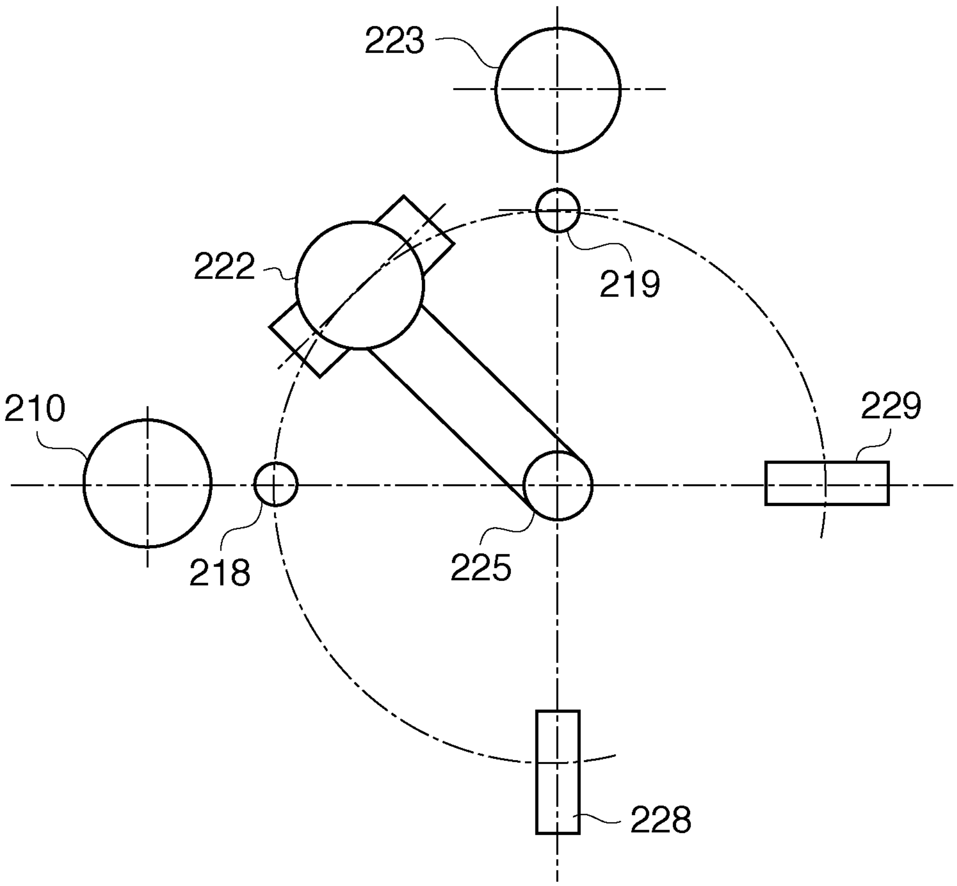
FIG. 2 is a schematic view showing the driving switching mechanism of the printing apparatus.

FIG. 2 is a schematic view showing the driving switching mechanism of the printing apparatus.

The driving switching mechanism includes the LF gear 210 arranged coaxially with the conveyance roller 214, an intermediate gear 222, and a pump gear 223. An LF beam 218 and pump beam 219 are arranged for the LF gear 210 and pump gear 223, respectively, so that the LF gear 210 and pump gear 223 engage with the intermediate gear 222.

To restrict the moving range of the intermediate gear 222, two barriers are arranged on a circular arc indicated by a chain line using the supporting point 225 of the intermediate gear 222 as a center. The two barriers are a barrier 228 against forward rotation (hereinafter simply denoted as barrier 228) which functions as a limit when the intermediate gear 222 moves counterclockwise, and a barrier 229 against reverse rotation (hereinafter simply denoted as barrier 229) which functions as a limit when the intermediate gear 222 moves clockwise. The intermediate gear 222 is movable within the range restricted by the barriers 228 and 229 under conditions to be described later.

When the conveyance motor is driven to rotate in reverse while the intermediate gear 222 engages with the pump gear 223, the suction operation by a pump (not shown) can be performed. When the conveyance motor is driven to rotate forward while the intermediate gear 222 engages with the LF gear 210, the printing medium conveyance operation can be performed.

A clutch lever (to be described later) is arranged to transfer a driving force from the conveyance motor to the cap. A driving force to move the cap and cap the ink discharge surface of the printhead 202 is transferred from the conveyance motor to the cap via the intermediate gear 222 and pump gear 223. While the intermediate gear 222 engages with the pump gear 223, the conveyance motor is driven to rotate forward, and the cam rotates once. Then, the cap can move up and down and the wiper can move back and forth.

In this arrangement, the switching position (home position) exists between the clutch lever and the cap.

The home position of the carriage 203 needs to be detected to stop the carriage 203 at a predetermined position for the capping and cleaning operations and the like. The stop position of the carriage 203 is controlled by calculating a position of the carriage 203 relative to the detected home position based on an encoder pulse count or the like.

In the initialization operation of the printing apparatus, the carriage 203 moves toward the frame 205 until it contacts and pushes a clutch lever 227. At this position (abutting position), the home position of the carriage 203 is detected.

Figure 3A:
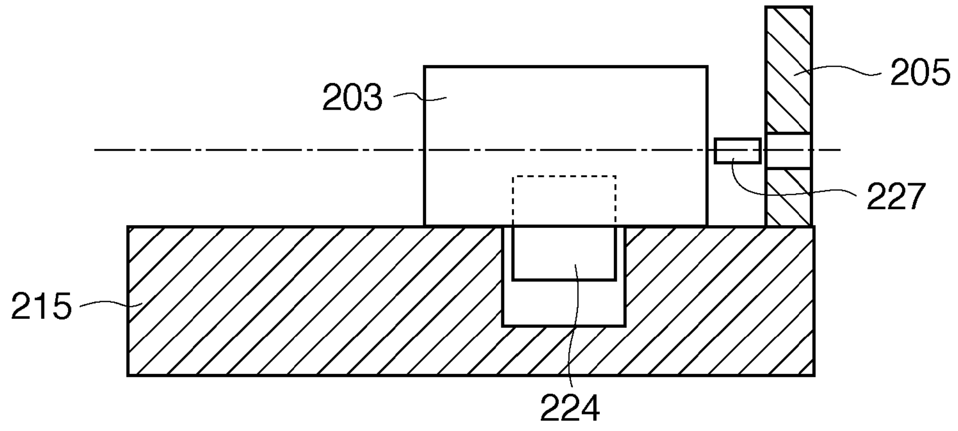
FIGS. 3A, 3B, and 3C are sectional views showing the positional relationship between a carriage, a cap, and a clutch lever when the printing apparatus is turned on and executes an initialization operation while the printhead is capped.
Figure 3B:
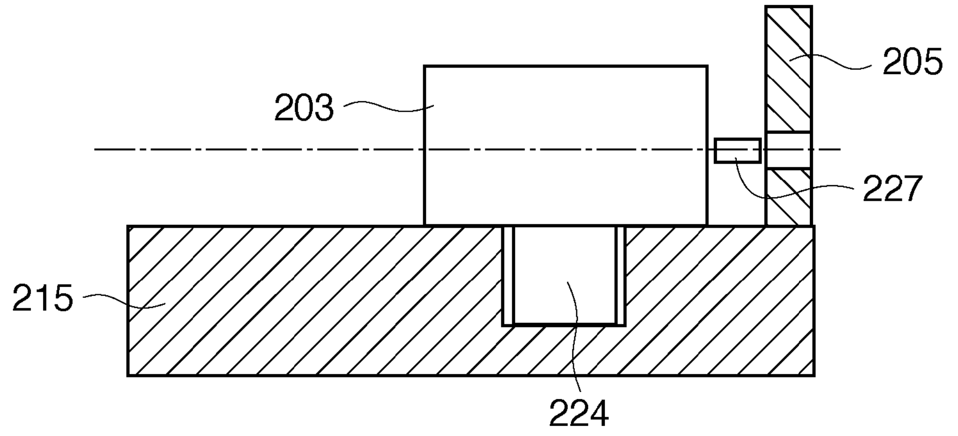
Figure 3C:
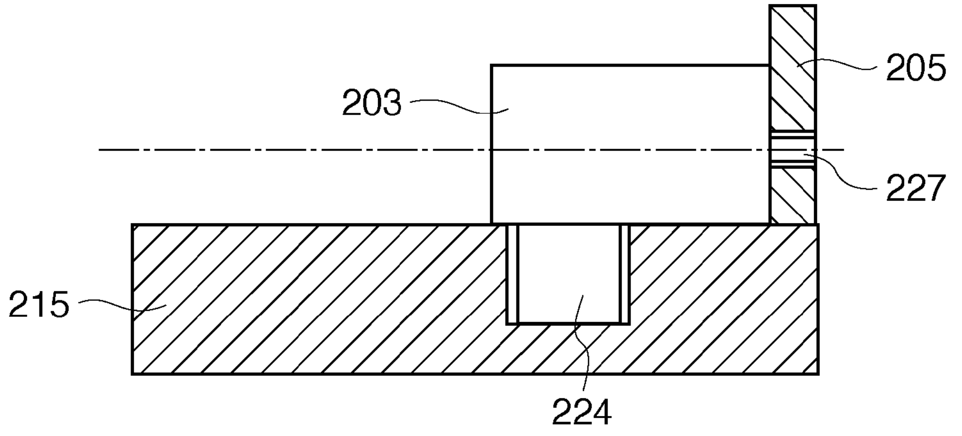

FIGS. 3A to 3C are sectional views showing the positional relationship between the carriage 203, a cap 224, and the clutch lever 227 when the printing apparatus is turned on and executes the initialization operation while the printhead is capped.

Figure 4A:
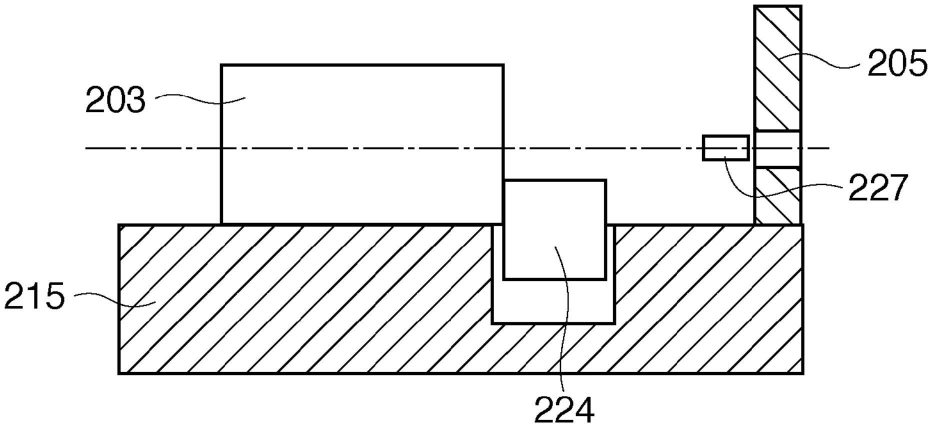
FIGS. 4A, 4B, and 4C are sectional views showing the positional relationship between the carriage, the cap, and the clutch lever when the printing apparatus is turned on and executes an initialization operation while the printhead is not capped.
Figure 4B:
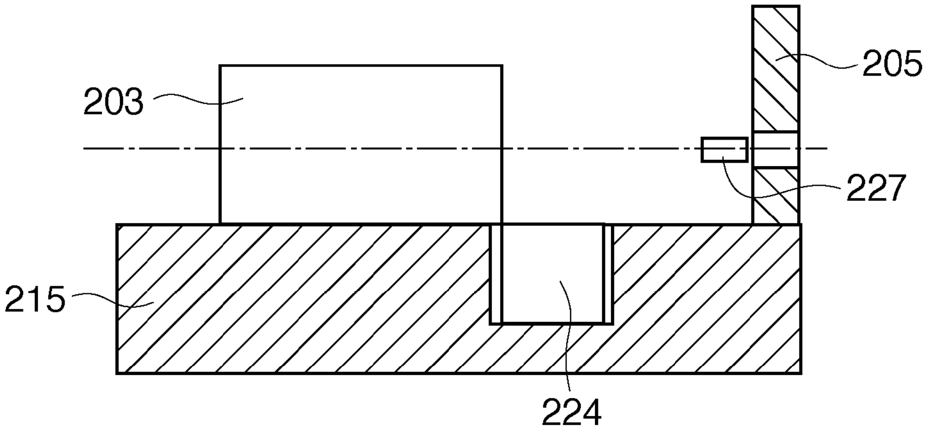
Figure 4C:
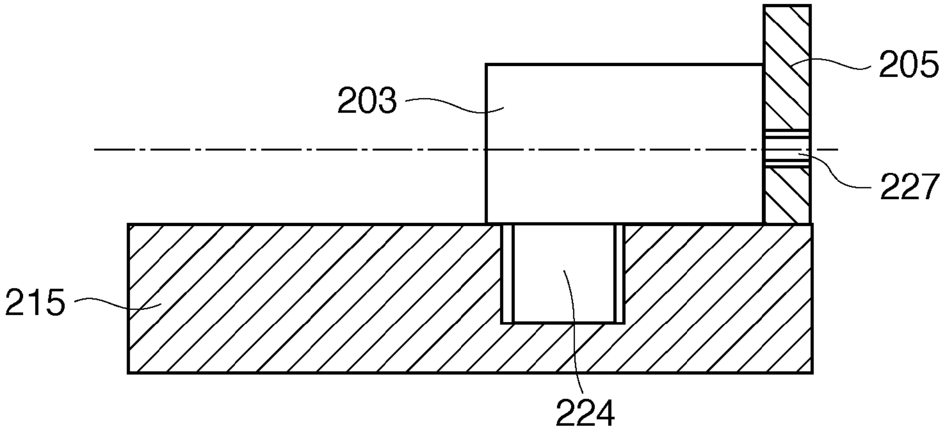

FIGS. 4A to 4C are sectional views showing the positional relationship between the carriage 203, the cap 224, and the clutch lever 227 when the printing apparatus is turned on and executes the initialization operation while the printhead is not capped.

FIGS. 3A to 3C and 4A to 4C show a state in which, as the carriage 203 moves toward the frame 205, it pushes the clutch lever 227 into a hole at a predetermined position of the frame 205. At this time, the cap 224 moves (downward in FIGS. 3A to 3C and 4A to 4C) to retract from the moving path of the carriage 203.

The abutting position of the carriage 203 is detected from position information fed back from the incremental linear encoder. This detection may be performed by arranging a photo-interrupter at the abutting position.

The operations shown in FIGS. 3A to 3C and 4A to 4C will be explained in detail later.

Figure 5:
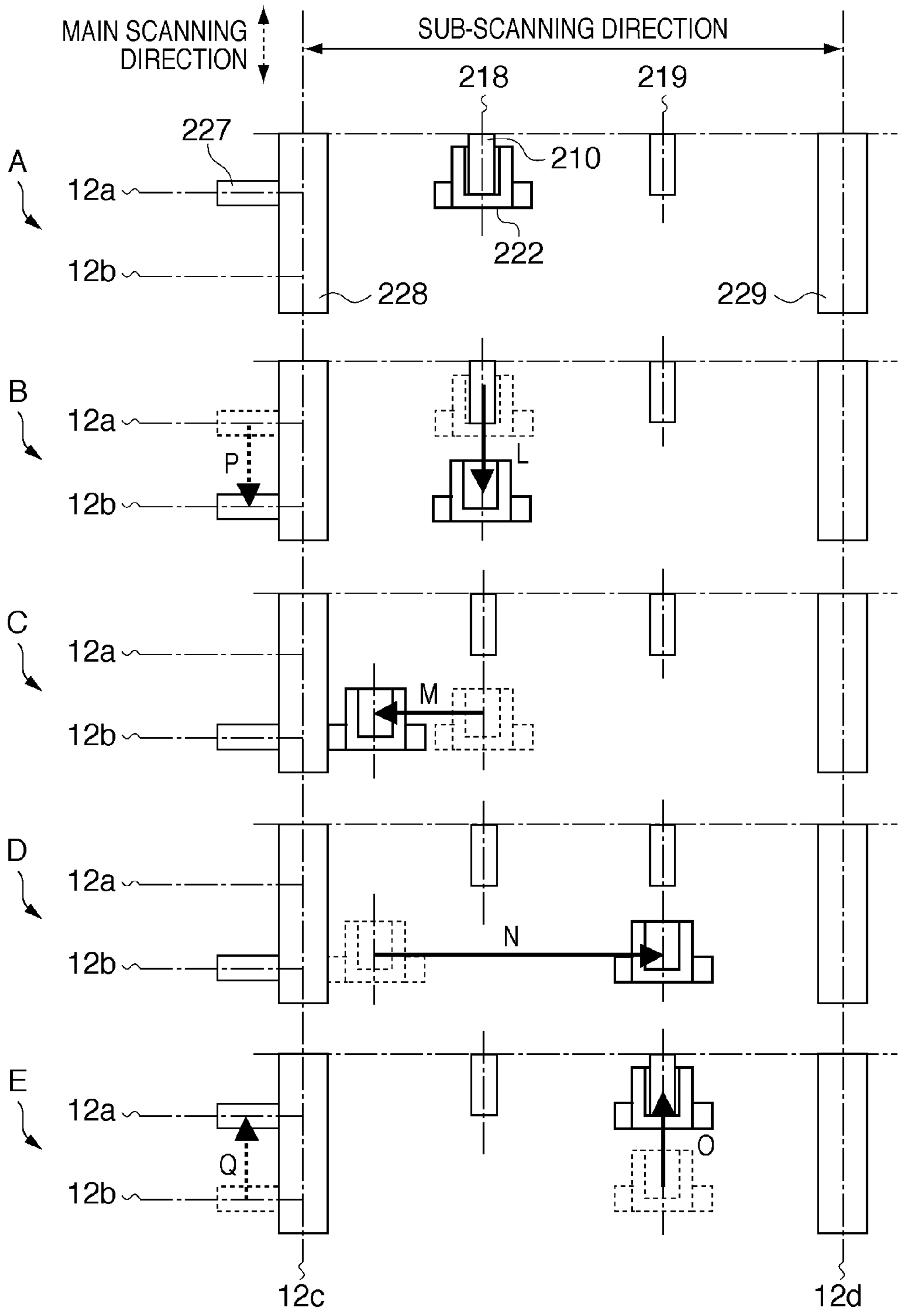
FIG. 5 is a view for explaining the concept of the driving switching operation of the printing apparatus.

FIG. 5 is a view for explaining the concept of the driving switching operation of the printing apparatus.

As shown in A of FIG. 5, while the intermediate gear 222 engages with the LF gear 210, rotation of the conveyance motor is transferred to the LF gear 210 via an LF motor gear (not shown) and the intermediate gear 222, rotating the conveyance roller 214.

As shown in FIGS. 3A to 3C and 4A to 4C, the clutch lever 227 is arranged to abut against the contact surface of the carriage 203 when the carriage 203 moves along the guide rail 204.

As shown in B of FIG. 5, the carriage 203 moves in the direction of an arrow P to push the clutch lever 227 from a position 12*a* (first position) to a position 12*b* (second position). The intermediate gear 222 moves from the position 12*a* to the position 12*b* in the direction of an arrow L in synchronism with the position of the clutch lever 227. As a result, the intermediate gear 222 and LF gear 210 disengage from each other.

While the intermediate gear 222 is at the position 12*b*, it can move within the range of the barrier 228 to the barrier 229 (from a position 12*c* (third position) to a position 12*d* (fourth position) in FIG. 5) using the supporting point 225 of the intermediate gear as a center, as shown in FIG. 2.

As shown in C of FIG. 5, the intermediate gear 222 moves in the direction of an arrow M to detect the initial position (position 12*c*) in order to stop the intermediate gear 222 at a predetermined position. The initial position is detected from position information fed back from an incremental rotary encoder. The incremental rotary encoder may be formed from the above-mentioned LF encoder sensor and LF cord wheel. Instead, the detection may be performed by a photo-interrupter arranged at the abutting position of the intermediate gear.

As shown in D of FIG. 5, a relative position from the initial position of the intermediate gear 222 to the pump gear 223 is calculated from an encoder pulse count or the like. In accordance with the calculated position, the intermediate gear 222 is moved in the direction of an arrow N and stops at the predetermined position.

As shown in E of FIG. 5, the intermediate gear 222 moves to an engaging position for fitting it on the pump beam 219. In this state, the carriage 203 is driven in the direction of an arrow Q, and the clutch lever 227 moves from the position 12*b* to the position 12*a* . The intermediate gear 222 moves from the position 12*b* to the position 12*a* in the direction of an arrow O in synchronism with the position of the clutch lever 227. The intermediate gear 222 is fitted on the pump beam 219, engages with the pump gear 223, and locked.

The intermediate gear 222 and clutch lever 227 include biasing means (not shown) such as springs which bias them in the directions of the arrows O and Q.

In this way, the engaging destination of the driving switching mechanism can be switched between the conveyance operation mechanism and the recovery operation mechanism.

As described above, the embodiment adopts the conveyance motor as a driving source for both the conveyance operation of the printing medium 201 and the recovery operation of the printhead 202. These operations are switched by the clutch lever 227 using movement of the carriage 203.

Figure 6:
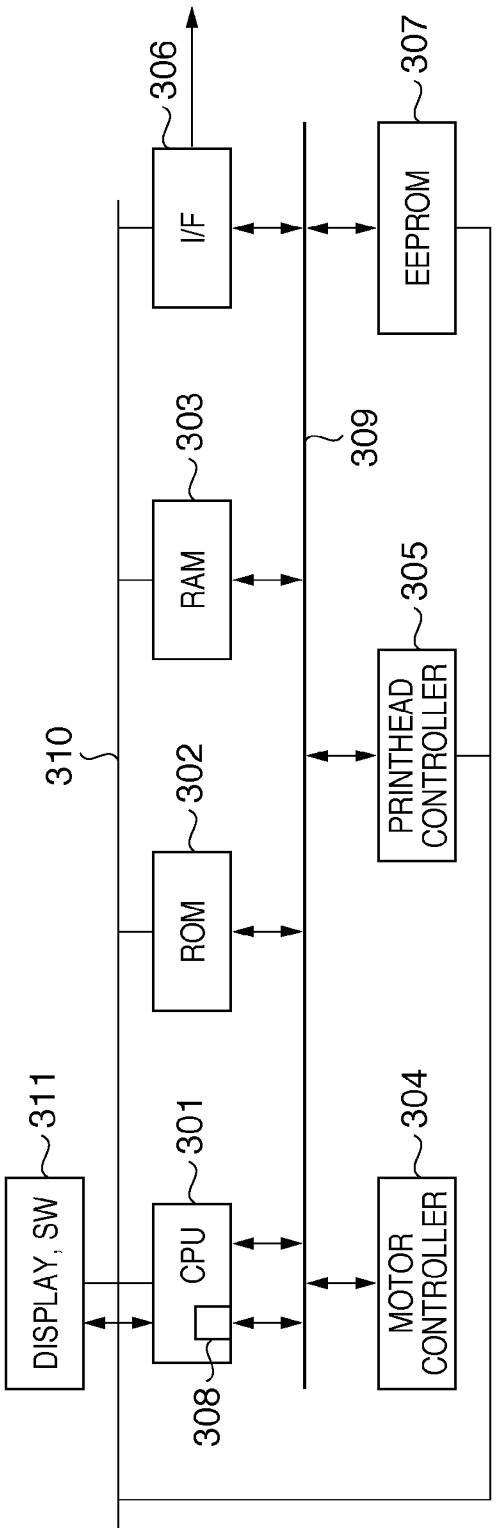
FIG. 6 is a block diagram showing the control arrangement of the printing apparatus.

FIG. 6 is a block diagram showing the control arrangement of the printing apparatus.

As shown in FIG. 6, a CPU 301 controls the overall apparatus by loading, into a RAM 303, a control program stored in a ROM 302 and executing it. The CPU 301 executes a printing operation based on print data transferred from a host (not shown) via an interface (I/F) 306. In the printing operation, the CPU 301 performs control to drive the carriage motor and conveyance motor via a motor controller 304. The CPU 301 also controls the printhead 202 via a printhead controller 305.

The respective units of the apparatus are connected to each other via a bus line 309, and receive necessary power via a power supply line 310. An EEPROM 307 stores various parameters and constants necessary for the printing operation.

The CPU 301 includes an A/D converter 308 to receive analog data from a sensor.

A variety of external instructions are input to the printing apparatus via a switch (SW) attached to a display panel 311. The display panel 311 displays various kinds of messages and the like.

Figure 7:
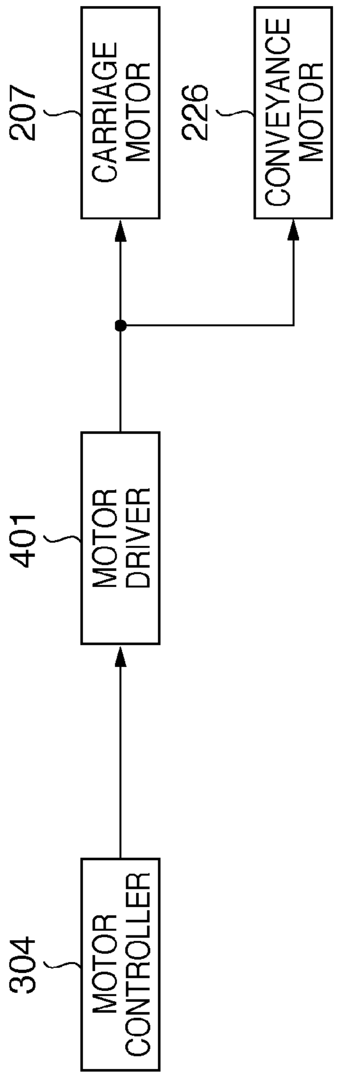
FIG. 7 is a conceptual view of motor driving control.

FIG. 7 is a conceptual view of motor driving control.

As described above, the CPU 301 performs control to drive the carriage motor and conveyance motor via the motor controller 304. In practice, in the printing apparatus, the motor controller 304 performs control to drive the carriage motor 207 and a conveyance motor 226 via a motor driver 401 for load distribution of the respective components of the apparatus.

The operation of the driving switching mechanism of the printing apparatus will now be explained.

Figure 8:
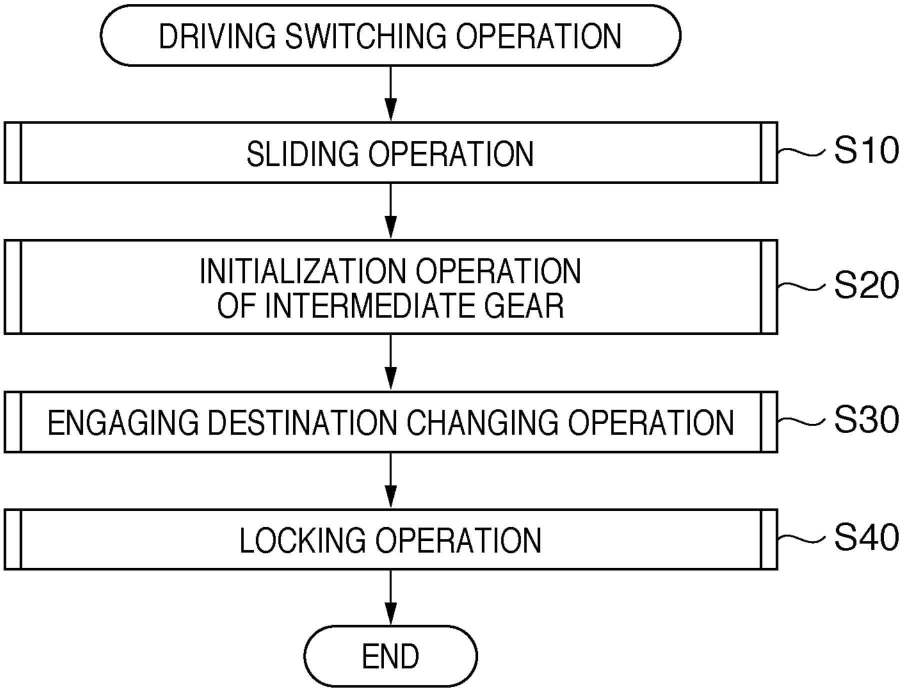
FIG. 8 is a flowchart showing an outline of the driving switching operation of the printing apparatus.

FIG. 8 is a flowchart showing an outline of the driving switching operation of the printing apparatus.

As shown in FIG. 8, the sequence of the driving switching operation is as follow.

First, a sliding operation is performed in step S10, and the operation of the intermediate gear is initialized in step S20. Then, in step S30, the engaging destination of the intermediate gear is changed. Finally in step S40, the intermediate gear is locked.

Detailed operations in steps S10 to S40 will now be explained with reference to flowcharts shown in FIGS. 9 to 12.

Figure 9:
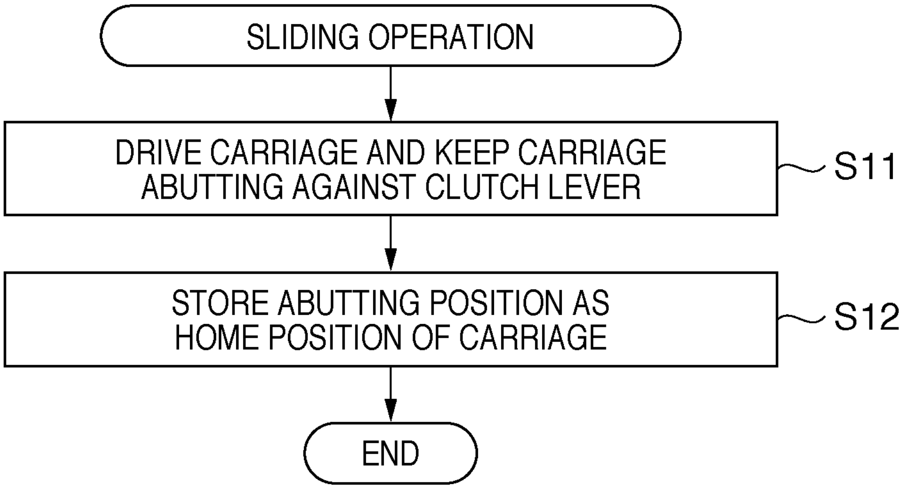
FIG. 9 is a flowchart showing details of a sliding operation.

FIG. 9 is a flowchart showing details of the sliding operation in step S10.

In step S11, the carriage 203 is driven to keep abutting the clutch lever 227 while the carriage motor 207 keeps rotating.

In step S12, the abutting position of the carriage 203 is stored as its home position. At this position, the carriage 203 abuts against the clutch lever 227 and pushes it, as shown in FIGS. 3C and 4C.

By this operation, the intermediate gear 222 disengages from the LF gear 210 or pump gear 223, and can freely switch its engaging destination.

Figure 10:
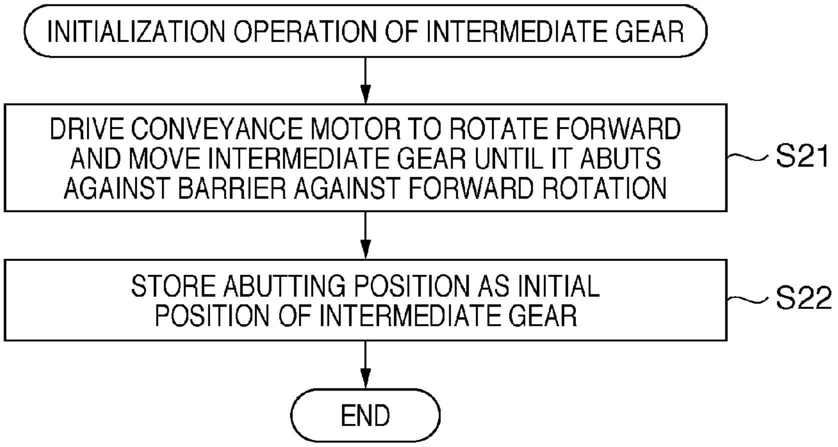
FIG. 10 is a flowchart showing details of an operation to initialize an intermediate gear.

FIG. 10 is a flowchart showing details of the operation to initialize the intermediate gear in step S20.

In step S21, the conveyance motor is driven to rotate forward, and the intermediate gear 222 moves until it abuts against the barrier 228. In other words, in FIG. 2, the intermediate gear 222 rotates counterclockwise on the supporting point 225 and moves to the barrier 228.

In step S22, the abutting position of the intermediate gear 222 is stored as its initial position.

At this time, detection by the LF encoder of a position where the intermediate gear 222 abuts against the barrier 228 is equivalent to detection of the initial position of the intermediate gear 222 by the LF encoder.

This operation can finalize the initial position of the intermediate gear 222. The initialization operation of the intermediate gear is executed while the intermediate gear 222 can freely switch its engaging destination when performing the sliding operation.

Figure 11:
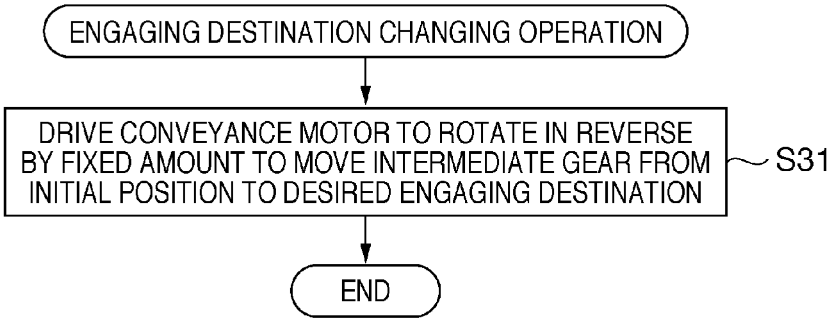
FIG. 11 is a flowchart showing details of an engaging destination changing operation.

FIG. 11 is a flowchart showing details of the engaging destination changing operation in step S30.

In step S31, the conveyance motor is driven to rotate in reverse by a fixed amount to move the intermediate gear 222 from the initial position to a desired engaging destination. Along with this, the intermediate gear 222 rotates and moves clockwise by a desired angle from the barrier 228 serving as the initial position. For example, when executing suction recovery of the printhead using the pump, the intermediate gear 222 rotates and moves to a position where it engages with the pump gear 223.

This operation can move the intermediate gear 222 to a desired engaging destination. The engaging destination changing operation is performed after the intermediate gear 222 moves to the initial position.

Figure 12:
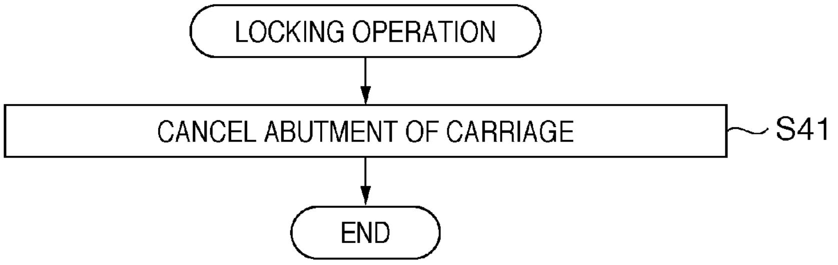
FIG. 12 is a flowchart showing details of a locking operation.

FIG. 12 is a flowchart showing details of the locking operation in step S40.

In step S41, a state in which the carriage 203 abuts against the clutch lever 227 and keeps pushing it is canceled.

By this operation, the intermediate gear 222 engages with the LF gear 210 or pump gear 223. The locking operation is executed after the intermediate gear 222 is moved to a desired engaging destination by the engaging destination changing operation.

This sequence can switch and finalize the engaging destination of the driving switching mechanism.

Before finalizing the engaging destination of the driving switching mechanism, the current engaging destination cannot be known unless the LF gear 210 or pump gear 223, which is highly likely to engage with the intermediate gear 222, is actually driven to determine the engaging destination of the intermediate gear 222 from the detection result of the sensor of the driven gear or the like.

<<Power-on While Printhead is Capped>>

An operation to finalize the engaging destination of the intermediate gear 222 when the printing apparatus is turned off while the printhead is capped will now be described.

When the printing apparatus is turned off while the printhead is capped, as shown in FIG. 3A, the cap 224 hermetically covers the orifice surface of the printhead 202 in order to prevent clogging of the ink discharge portion of the printhead 202. The EEPROM holds information representing whether or not the printhead was capped upon power-off. This information reveals the capping state when turning on the printing apparatus next time.

When the printing apparatus is turned on while the printhead is capped, it is determined based on the information held in the EEPROM that the engaging destination of the driving switching mechanism is the pump gear 223. This is because the printhead is capped for suction recovery of the printhead. To execute the suction recovery, the pump needs to be driven. Thus, the intermediate gear is regarded to engage with the pump gear.

In the initialization operation of the printing apparatus, it is determined that the cap 224 works as an obstacle to block out the operation of the carriage 203.

Hence, the driving switching operation is executed to finalize the home position of the carriage 203 and the engaging destination of the intermediate gear.

The conveyance motor is driven to rotate forward and the cap 224 is retracted. As the conveyance motor is driven to rotate forward, the cap 224 moves downward. The motion of the cap 224 will be complemented. The apparatus includes a mechanism which moves the cap 224 upward when the conveyance motor keeps rotating forward and the cap 224 reaches the lowermost position within the vertical movement range.

After the cap 224 is retracted as shown in FIG. 3B, the carriage 203 becomes freely movable.

As shown in FIG. 3C, the foregoing sliding operation is executed. A position where the carriage 203 abuts against the clutch lever 227 is stored as the home position of the carriage 203.

The subsequent operation is the same as the above-described sequence of the driving switching operation, and a description thereof will not be repeated.

This operation can finalize the home position of the carriage 203 and the engaging destination of the driving switching mechanism.

<<Power-on While Printhead is Not Capped>>

Next, an operation to finalize the engaging destination of the intermediate gear when the printing apparatus is turned off while the printhead is not capped will be explained. When the printing apparatus is turned off while the printhead is not capped, it is not possible to determine whether or not the cap 224 works as an obstacle to (block out) the operation of the carriage 203.

The first driving switching operation is executed to assuredly eliminate any obstacle and finalize an engaging destination, though the home position of the carriage 203 cannot be finalized.

After eliminating an obstacle, the second driving switching operation is performed to finalize the home position of the carriage 203.

The first driving switching operation will now be described.

As shown in FIG. 4A, a position where the carriage 203 abuts against the cap 224 upon performing the sliding operation is regarded as a position where the carriage 203 abuts against the clutch lever 227. The carriage 203 keeps abutting against the clutch lever 227 and pushing it. That is, the CPU 301 controls driving of the carriage motor (abutment control) to move the carriage 203 further to the right in FIG. 4A. A position where the carriage 203 abuts against the cap 224 at this time is stored as the temporary home position of the carriage 203. Since the carriage 203 abuts against the cap 224, the intermediate gear 222 is regarded to physically engage with the pump gear 223.

Thereafter, the initialization operation of the intermediate gear is executed.

As shown in FIG. 4B, when the conveyance motor is driven to rotate forward in the initialization operation of the intermediate gear, the intermediate gear 222 rotates and moves counterclockwise on the supporting point 225. Since the intermediate gear 222 engages with the pump gear 223, the cap 224 can be retracted during driving. At this time, the forward rotation driving amount of the conveyance motor is assumed to exceed a driving amount necessary to at least retract the cap 224.

The carriage 203 keeps abutting against the cap 224. After the cap 224 is retracted, the carriage 203 moves to the clutch lever 227 and abuts against it, as shown in FIG. 4C. That is, under the abutment control of the CPU 301, the cap 224 is retracted and the carriage 203 moves to the clutch lever 227.

Only after the carriage 203 moves to the clutch lever 227, the intermediate gear 222 can freely switch its engaging destination. Since the conveyance motor keeps rotating forward, the intermediate gear 222 abuts against the barrier 228.

A position where the intermediate gear 222 abuts against the barrier 228 is then detected. The forward rotation driving of the conveyance motor stops.

Further, the engaging destination changing operation is executed.

The intermediate gear 222 has moved to the initial position by the initialization operation of the intermediate gear. The intermediate gear 222 is driven by a fixed amount corresponding to a distance from this position to a desired engaging destination.

Finally, the locking operation is performed.

The above operation can assuredly eliminate any obstacle and finalize an engaging destination.

The second driving switching operation will now be described.

The first driving switching operation has eliminated an obstacle and finalized an engaging destination. As for the home position of the carriage 203, the position where the carriage 203 abutted against the cap 224 is kept stored as the temporary home position.

Hence, the driving switching operation is performed again.

This driving switching operation is the same as the above-described one executed in an initialization operation when the printing apparatus is powered off and then on while the printhead is capped, and a description thereof will not be repeated.

The second driving switching operation can finalize the home position of the carriage 203.

As described above, detection of the abutting position of the carriage can be utilized to reliably switch the intermediate gear between the first state in which it engages with the LF gear and the second state in which it engages with the pump gear. In the first state, the driving force of the conveyance motor can be transferred to the conveyance mechanism. In the second state, the driving force of the conveyance motor can be transferred to the recovery mechanism.

As the home position of the carriage 203, its abutment is detected from position information fed back from the incremental linear encoder. This detection can be achieved using a conventional component without increasing the number of components.

According to the above-described embodiment, the carriage moves toward the clutch lever until it abuts against the clutch lever. Then, the driving switching mechanism acts to transfer, to even the recovery mechanism, the driving force of the conveyance motor for driving the conveyance mechanism. When turning on the apparatus, depending on the capping state of the printhead, it is not possible to determine whether the carriage abuts against the clutch lever or an obstacle (cap) interlocked with another mechanism. In this case, even if the carriage abuts against the obstacle, a position where the abutment against the obstacle was detected is regarded as the temporary home position of the carriage. While the conveyance motor is driven to make the intermediate gear engage with a desired engaging destination, the obstacle is eliminated. The intermediate gear can engage with the desired engaging destination.

In this fashion, the embodiment can reliably perform the driving switching operation using movement of the carriage without any restriction on the positional relationship between the clutch, the driving switching position, and the cap.

This arrangement is simple and does not raise the manufacturing cost.

In the above-described embodiment, droplets discharged from the printhead 202 applied to the printing apparatus are ink, and the liquid contained in the ink tank is ink. However, the content of the ink tank is not limited to ink. For example, the ink tank may store a processed liquid to be discharged onto the printing medium 201 in order to improve the fixing property, water repellency, and image quality of a printed image.

Of inkjet printing methods, the above described embodiment adopts a method which uses a means (e.g., an electrothermal transducer) for generating heat energy as energy to discharge ink. The heat energy changes the ink state. This method can achieve high printing density and high resolution.

The embodiment has exemplified an inkjet printing apparatus as the printing apparatus, but the present invention is not limited to this. The present invention is applicable to a wire dot printing method, thermal transfer method, and the like to drive a conveyance mechanism and additional mechanism using a single driving source when the additional mechanism is arranged together with the carriage reciprocating mechanism and printing medium conveyance mechanism.

The inkjet printing apparatus according to the present invention is used as an image output apparatus for an information processing device such as a computer. The inkjet printing apparatus may take the form of a copying machine combined with a reader or the like, or a facsimile apparatus having a transmission/reception function.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-214639, filed Aug. 22, 2008, which is hereby incorporated by reference herein in its entirety.

What is claimed is:

1. A printing apparatus which reciprocates a carriage supporting a printhead by a driving force of a carriage motor and prints on a printing medium using the printhead, the apparatus comprising:

a conveyance unit configured to convey the printing medium using a driving force of a conveyance motor;

a recovery unit configured to recover the printhead using the driving force of the conveyance motor;

a transfer unit configured to transfer the driving force of the conveyance motor to either of said conveyance unit and said recovery unit;

a switching unit configured to switch a transfer destination of the driving force of the conveyance motor by said transfer unit;

a detection unit configured to detect a home position of reciprocation of the carriage; and a control unit configured to perform control to operate said switching unit based on the home position detected by said detection unit to transfer the driving force of the conveyance motor to either of said conveyance unit and said recovery unit, wherein said switching unit comprises a clutch lever which can move in a moving direction of the carriage as the carriage moves, when said clutch lever moves from a first position to a second position serving as the home position of the carriage as the carriage moves, said control unit performs control to operate said switching unit and cut off transfer of the driving force of the conveyance motor by said transfer unit, when said clutch lever is located at the second position, said transfer unit becomes movable between a third position and a fourth position, said transfer unit moves to the third position serving as a home position of said transfer unit by the driving force of the conveyance motor, and said transfer unit moves in a direction from the third position to the fourth position to reach either of a position where said transfer unit can transfer the driving force of the conveyance motor to said conveyance unit and a position where said transfer unit can transfer the driving force of the conveyance motor to said recovery unit, thereby transferring the driving force of the conveyance motor to either said conveyance unit or said recovery unit.

2. The apparatus according to claim 1, wherein said conveyance unit includes:

a conveyance roller which rotates by the driving force of the conveyance motor; and a conveyance gear which transfers the driving force of the conveyance motor to the conveyance roller, said recovery unit includes:

a cap which caps the printhead; and a pump gear which transfers the driving force of the conveyance motor to a pump used to recover the printhead, said transfer unit includes an intermediate gear which transfers the driving force of the conveyance motor to either of the conveyance gear, and the pump gear and the cap, and transfer of the driving force of the conveyance motor to said conveyance unit is performed by engagement between the conveyance gear and the intermediate gear, and transfer of the driving force of the conveyance motor to said recovery unit is performed by engagement between the pump gear and the intermediate gear.

3. The apparatus according to claim 2, wherein the cap is located at a position where the cap blocks out movement of the carriage while capping the printhead.

4. The apparatus according to claim 3, wherein when the apparatus is turned off and on again while the cap caps the printhead, said control unit transfers the driving force of the conveyance motor to the cap via the intermediate gear, cancels capping of the printhead by the cap, and causes the intermediate gear to engage with either of the conveyance gear and the pump gear.

5. The apparatus according to claim 3, wherein when the apparatus is turned off and on again while the cap is not capping the printhead, said control unit drives the carriage motor to move the carriage, regards, as a temporary home position of the carriage, a position where the carriage abuts against the cap, transfers the driving force of the conveyance motor to the cap via the intermediate gear, cancels capping of the printhead by the cap, further moves the intermediate gear, and causes the intermediate gear to engage with either of the conveyance gear and the pump gear.

6. The apparatus according to claim 1, wherein the printhead includes an inkjet printhead having an orifice for discharging ink, and said recovery unit recovers ink discharge of the inkjet printhead.

7. The apparatus according to claim 6, wherein the inkjet printhead includes an electrothermal transducer for generating heat energy used to discharge ink from the orifice.

8. A printing apparatus which reciprocates a carriage supporting a printhead to print on a printing medium using the printhead, the apparatus comprising:

a motor;

a conveyance unit configured to convey the printing medium using a driving force of said motor;

a recovery unit configured to recover the printhead using the driving force of said motor; and a transfer unit, having a gear and a clutch, configured to changeably transfer the driving force of said motor to either of said conveyance unit and said recovery unit, wherein, when the carriage moves to a home position, the clutch is caused by movement of the carriage to shift, transfer of the driving force by the gear is cut off, and the gear becomes movable within a range including a first position where the gear can transfer the driving force to said conveyance unit and a second position where the gear can transfer the driving force to said recovery unit, and when changing connection of the driving force, the movement of the carriage causes the clutch to shift, the gear moves to one end of the range, and the gear further moves from the one end to either of the first position or the second position.

9. The apparatus according to claim 8, wherein the printhead includes an inkjet printhead for discharging ink, said recovery unit has a cap for capping the printhead, and the cap is located at a position where the cap blocks out movement of the carriage while capping the printhead.

* * * * *